United States Patent
Lee et al.

(10) Patent No.: US 10,768,766 B2
(45) Date of Patent: *Sep. 8, 2020

(54) TOUCH WINDOW HAVING A SENSING ELECTRODE WITH A VARIABLE WIDTH OF A CONDUCTIVE LINE

(71) Applicant: LG INNOTEK CO., LTD., Seoul (KR)

(72) Inventors: Jae Hong Lee, Seoul (KR); Chan Kyu Koo, Seoul (KR); Hyun Soo Kim, Seoul (KR); Jun Sik Shin, Seoul (KR); Joon Hyuk Yang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/935,665

(22) Filed: Mar. 26, 2018

(65) Prior Publication Data

US 2018/0217704 A1    Aug. 2, 2018

Related U.S. Application Data

(63) Continuation of application No. 14/516,697, filed on Oct. 17, 2014, now Pat. No. 9,959,003.

(30) Foreign Application Priority Data

Oct. 17, 2013 (KR) .......................... 10-2013-0124249

(51) Int. Cl.
  *G06F 3/038*  (2013.01)
  *G09G 5/00*   (2006.01)
  *G06F 3/045*  (2006.01)
  *G06F 3/044*  (2006.01)

(52) U.S. Cl.
  CPC .............. *G06F 3/045* (2013.01); *G06F 3/044* (2013.01)

(58) Field of Classification Search
  None
  See application file for complete search history.

(56) References Cited

U.S. PATENT DOCUMENTS

| 7,741,163 B2 | 6/2010 | Hu et al. |
| 9,678,586 B2 | 6/2017 | Reynolds |
| 2009/0160783 A1* | 6/2009 | Yang ....................... G06F 3/044 345/173 |
| 2009/0219257 A1 | 9/2009 | Frey et al. |

(Continued)

FOREIGN PATENT DOCUMENTS

| CN | 103092422 | 5/2013 |
| CN | 103164100 A | 6/2013 |

(Continued)

OTHER PUBLICATIONS

Definition of window, http://www.dictionary.com/browse/window?s=t, p. 1.*

(Continued)

*Primary Examiner* — Lunyi Lao
*Assistant Examiner* — Kirk W Hermann
(74) *Attorney, Agent, or Firm* — KED & Associates LLP

(57) ABSTRACT

Disclosed is a touch window including a sensing electrode to sense a position, and a wire to electrically connect the sensing electrode. A width of the sensing electrode is variable in the sensing electrode.

30 Claims, 10 Drawing Sheets

(56) References Cited

U.S. PATENT DOCUMENTS

| | | | |
|---|---|---|---|
| 2011/0090170 A1* | 4/2011 | Lin | G06F 3/044 345/174 |
| 2011/0096005 A1* | 4/2011 | Kim | G06F 3/044 345/173 |
| 2011/0242057 A1* | 10/2011 | Lee | G06F 3/041 345/176 |
| 2011/0291966 A1* | 12/2011 | Takao | G06F 3/044 345/173 |
| 2012/0044189 A1* | 2/2012 | Lin | G06F 3/044 345/174 |
| 2012/0062510 A1* | 3/2012 | Mo | G06F 3/044 345/174 |
| 2012/0193130 A1 | 8/2012 | Fix et al. | |
| 2013/0093721 A1 | 4/2013 | Nakamura et al. | |
| 2013/0106751 A1 | 5/2013 | Wang et al. | |
| 2013/0207911 A1 | 8/2013 | Barton et al. | |
| 2013/0299222 A1* | 11/2013 | Lee | G06F 3/044 174/258 |
| 2013/0342504 A1 | 12/2013 | Hwang et al. | |
| 2014/0216783 A1* | 8/2014 | Trauernicht | G06F 3/044 174/126.1 |
| 2014/0218642 A1* | 8/2014 | Iwami | G06F 3/044 349/12 |
| 2014/0293150 A1* | 10/2014 | Tang | G06F 3/044 349/12 |
| 2014/0320761 A1* | 10/2014 | Misaki | G06F 3/044 349/12 |
| 2015/0077361 A1 | 3/2015 | Seo et al. | |
| 2016/0011683 A1* | 1/2016 | Koshimizu | G06F 1/16 345/173 |
| 2016/0147337 A1 | 5/2016 | Lee | |
| 2016/0370916 A1* | 12/2016 | Hashimoto | G06F 3/044 |

FOREIGN PATENT DOCUMENTS

| | | |
|---|---|---|
| EP | 3 009 017 | 1/2015 |
| EP | 2 848 993 A1 | 3/2015 |
| JP | 2012-079238 | 4/2012 |
| JP | 2012-522282 | 9/2012 |
| JP | 2012-198879 | 10/2012 |
| JP | 2013-084166 | 5/2013 |
| JP | 2013-101504 | 5/2013 |
| JP | 2013101504 A * | 5/2013 |
| JP | 2013-152599 A | 8/2013 |
| KR | 10-2012-0091408 A | 8/2012 |
| KR | 10-2013-0074933 A | 7/2013 |
| TW | I298211 | 6/2008 |
| TW | 201322085 | 6/2013 |
| WO | WO 2008/079596 A1 | 7/2008 |
| WO | WO 2012/177312 | 12/2012 |
| WO | WO 2013/051548 A1 | 4/2013 |
| WO | WO 2013/095079 A1 | 6/2013 |
| WO | WO-2014157632 A1 * 10/2014 ............. G06F 3/041 |

OTHER PUBLICATIONS

Dictionary.com definition of window, 2018, http://www.dictionary.com/browse/window?s=t, p. 1 (Year: 2018).*

Chinese Office Action dated Apr. 25, 2018 issued in Application No. 201410554091.3 (with English Translation).

Taiwanese Office Action dated May 28, 2018 issued in Application No. 103135546 (with English Translation).

Japanese Office Action dated Jun. 28, 2018 issued in Application No. 2014-212373.

European Search Report dated May 7, 2015 issued in Application No. 14189202.6.

European Patent Office communication issued in Application 14 189 202.6 dated Jan. 29, 2018.

Korean Office Action dated Nov. 29, 2019 issued in Application No. 10-2013-0124249.

Japanese Office Action dated Dec. 3, 2019 issued in Application No. 2018-227986.

* cited by examiner

1st direction
2nd direction

TOUCH WINDOW HAVING A SENSING ELECTRODE WITH A VARIABLE WIDTH OF A CONDUCTIVE LINE

CROSS-REFERENCE TO RELATED APPLICATIONS

This application is a Continuation Application of U.S. patent application Ser. No. 14/516,697 filed Oct. 17, 2014, which claims priority under 35 U.S.C. § 119 to Korean Application No. 10-2013-0124249 filed on Oct. 17, 2013, whose entire disclosures are hereby incorporated by reference.

BACKGROUND

1. Field

The disclosure relates to a touch window and a touch device including the same.

2. Background

Recently, a touch panel, which performs an input function through the touch of an image displayed on a touch device by an input device, such as a stylus pen or a finger, has been applied to various electronic appliances.

The touch panel may be representatively classified into a resistive touch panel and a capacitive touch panel. In the resistive touch panel, the position of the touch point is detected by detecting the variation in resistance according to the connection between electrodes when pressure is applied to the input device. In the capacitive touch panel, the position of the touch point is detected by detecting the variation in capacitance between the electrodes when a finger of the user is touched on the capacitive touch panels. Recently, the capacitive touch panel has been spotlighted in a smaller model when taking into consideration the convenience in a manufacturing scheme and a sensing power.

Meanwhile, a sensing electrode of the touch panel is electrically connected to a wire and the wire is connected to an external circuit so that the touch panel may be driven. In this case, short circuit may occur between the sensing electrode and the wire due to variation in a design or in density. Further, the sensing electrode may not smoothly make electrical connection with the wire due to crack in the sensing electrode so that the characteristics of the sensing electrode may be degraded.

BRIEF DESCRIPTION OF THE DRAWINGS

The embodiments will be described in detail with reference to the following drawings in which like reference numerals refer to like elements wherein.

DETAILED DESCRIPTION

Figure 1:
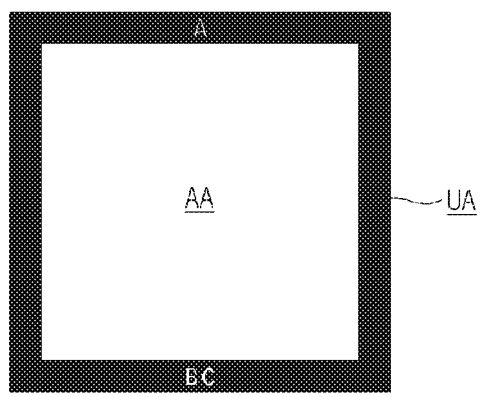
FIG. 1 is a plan view schematically showing a touch window according to the embodiment.

In the description of the embodiments, it will be understood that, when a layer (or film), an area, a pattern, or a structure are referred to as being "on" or "under" another substrate, another layer (or film), another area, another pad, or another pattern, it can be "directly" or "indirectly" on the other substrate, layer (or film), area, pad, or pattern, or one or more intervening layers may also be present. Such a position of the layer has been described with reference to the drawings.

The thickness and size of each layer (or film), each area, each pattern, or each structure shown in the drawings may be exaggerated, omitted or schematically drawn for the purpose of convenience or clarity. In addition, the size of elements does not utterly reflect an actual size.

Hereinafter, the embodiment of the present invention will be described in detail with reference to accompanying drawings.

Figure 2:
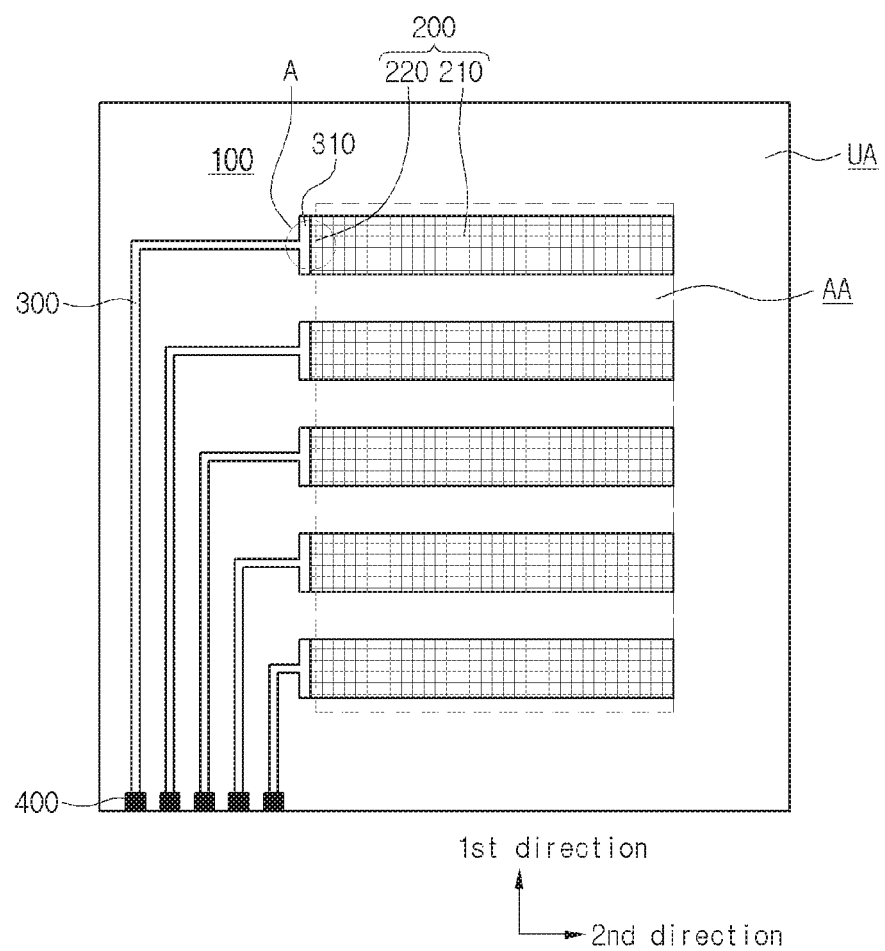
FIG. 2 is a plan view showing the touch window according to the embodiment.
Figure 3:
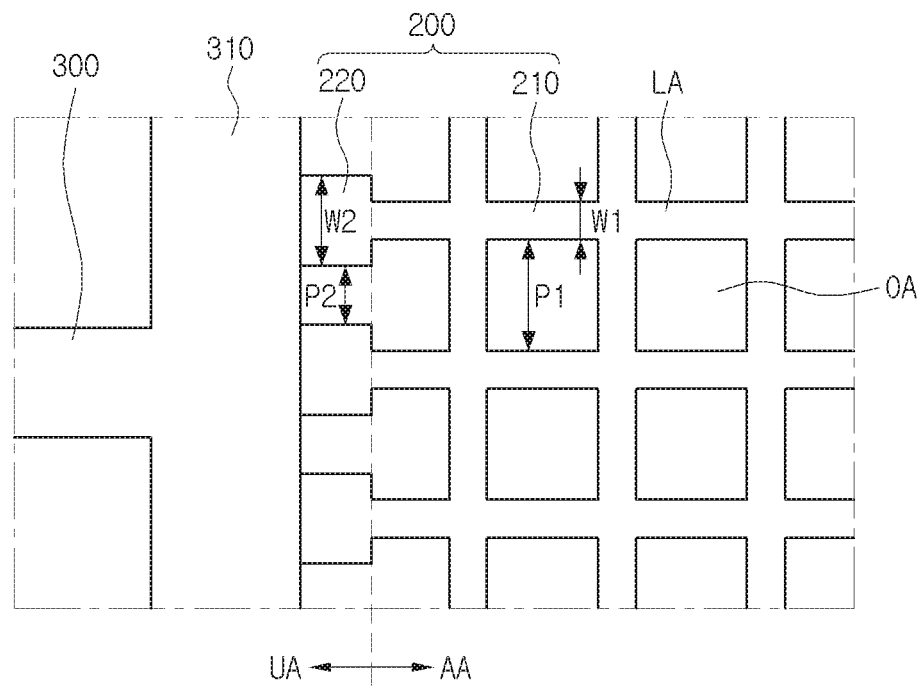
FIG. 3 is an enlarged view showing a part A of FIG. 2.

Hereinafter, a touch window according to an embodiment will be described in detail with reference to FIGS. 1 to 3. FIG. 1 is a plan view schematically showing a touch window according to the embodiment. FIG. 2 is a plan view showing the touch window according to the embodiment. FIG. 3 is an enlarged view showing a part A of FIG. 2.

Referring to FIGS. 1 to 3, a touch window 10 according to the embodiment includes a substrate 100 having an active area AA, in which a position of an input device (e.g., finger) is detected, and an unactive area UA provided at a peripheral portion of the active area AA.

In this case, a sensing electrode 200 may be formed in the active area AA and the unactive area UA to sense the input device. In addition, a wire 300 may be formed in the unactive area UA for the electrical connection of the sensing electrode 200. In addition, an external circuit connected to the wire 300 may be positioned in the unactive area UA.

If the input device such as a finger is touched on the touch window, the variation in capacitance is made on a touched portion by the input device, and the touched portion representing the variation in the capacitance may be detected as a touch point.

Hereinafter, the touch window will be described in more detail.

The substrate 100 may include a glass substrate or a plastic substrate including polyethylene terephthalate (PET) film or resin, but the embodiment is not limited thereto. In other words, the substrate 100 may include various materials to form the sensing electrode 200 and the 300.

An outer dummy layer is formed in the unactive area UA of the substrate 100. The outer dummy layer may be coated with a material having a predetermined color so that the wire 300 and a printed circuit board connecting the wire 300 to external circuits cannot be viewed from the outside. The outer dummy layer may have a color suitable for a desired outer appearance thereof. For example, the outer dummy layer includes black pigments to represent black. In addition, a desired logo may be formed in the outer dummy layer through various schemes. The outer dummy layer may be formed through deposition, print, and wet coating schemes.

The sensing electrode 200 may be formed on the substrate 100. The sensing electrode 200 may detect whether the input device such as the finger is touching or not. FIG. 2 shows the sensing electrode 200 extending in a second direction on the substrate 100, but the embodiment is not limited thereto. Accordingly, the sensing electrode 200 may extend in a first direction crossing the second direction. In addition, the sensing electrode 200 may have two types of sensing electrodes having shapes extending in the first and second directions.

Meanwhile, the sensing electrode 200 may be arranged in the shape of a mesh. The mesh shape may be randomly provided so that a moiré phenomenon can be prevented. The Moire phenomenon occurs when striped patterns are overlapped with each other. As adjacent striped patterns are overlapped with each other, the thickness of the striped patterns is increased, so that the overlapped striped patterns more stand out as compared with other stripped patterns. Therefore, the shape may be variously provided to prevent the Moire phenomenon.

In detail, the sensing electrode 200 includes a conductive pattern opening OA and a conductive pattern line part LA. In this case, the line width of the conductive pattern line part LA may be in the range of 0.1 μm to 10 μm. The conductive pattern line part LA of 0.1 μm or less may not be formed due to the characteristic of the manufacturing process. If the line width is 10 μm or less, the pattern of the sensing electrode 200 may not be viewed. Preferably, the line width of the conductive pattern line part LA may be in the range of 1 μm to 7 μm. More preferably, the line width of the conductive pattern line part LA may be in the range of 2 μm to 5 μm.

Meanwhile, as shown in FIG. 3, the conductive pattern opening OA may have the shape of a rectangle, but the embodiment is not limited thereto. The conductive pattern opening OA may have various shapes such as a polygonal shape including a diamond shape, a pentagonal shape, or a hexagonal shape, or a circular shape.

The sensing electrode 200 may include a metallic oxide such as an indium tin oxide, an indium zinc oxide, a copper oxide, a tin oxide, a zinc oxide, or a titanium oxide. In addition, the sensing electrode 200 may include an interconnecting structure, a photosensitive nanowire film, a carbon nano-tube (CNT), graphene, conductive polymer, or various metals. In this case, the interconnecting structure may include a fine structure having a diameter in the range of 10 nm to 200 nm. Preferably, the interconnecting structure may include a fine structure having a diameter in the range of 20 nm to 100 nm. The interconnecting structure may include a nanowire. In addition, when the sensing electrode 200 includes metal, the sensing electrode 200 may include Cr, Ni, Cu, Al, Ag, Mo, and the alloy thereof.

The sensing electrode 200 has the mesh shape, so that the pattern of the sensing electrode 200 may not be viewed in the active area AA. In other words, even if the sensing electrode 200 may include metal, the pattern of the sensing electrode 200 may not be viewed. In addition, even if the sensing electrode 200 is applied to a large-scale touch window, the resistance of the touch window may be lowered. In addition, if the sensing electrode 200 is formed through a printing process, printing quality can be improved, so that a high-quality touch window can be ensured.

Referring to FIG. 3, the sensing electrode 200 includes a first sensing part 210 and a second sensing part 220.

The first sensing part 210 may be the sensing electrode 200 on the active area AA. The second sensing part 210 may be provided throughout the active area AA and the unactive area UA.

The second sensing part 220 may be the sensing electrode 200 provided on the unactive area UA, and may be the sensing electrode 200 provided on the active area AA. In addition, the second sensing part 22 may be provided throughout the active area AA and the unactive area UA. The second sensing part 220 may be provided between the first sensing part 210 and the wire 300. The second sensing part 220 may electrically connect the first sensing part 210 with the wire 300. The second sensing part 220 may directly make contact with a wire pad part 310.

A conductive pattern of the first sensing part 210 may have a shape different from that of a conductive pattern of the second sensing part 220.

The conductive pattern of the first sensing part 210 may have a line width W1 different from a line width W2 of the conductive pattern of the second sensing part 220. In detail, the conductive pattern of the second sensing part 220 may have the line width W2 thicker than the line width W1 of the conductive pattern of the first sensing part 210.

In addition, a pitch P1 between conductive patterns of the first sensing part 210 may be different from a pitch P2 between conductive patterns of the second sensing part 220. In detail, the pitch P2 between the conductive patterns of the second sensing part 220 may be narrower than the pitch P1 between the conductive patterns of the first sensing part 210.

The line width W2 of the conductive pattern of the second sensing part 220 may be wider than the line width W1 of the conductive pattern of the first sensing part 210, and narrower than a half of the pitch P1 between the conductive patterns of the first sensing part 210. If the line width W2 of the conductive pattern of the second sensing part 220 is wider than a half of the pitch P1 between the conductive patterns of the first sensing part 210, the conductive patterns make contact with each other, so that the electrical short may occur.

Accordingly, the contact area between the sensing electrode 200 and the wire 300 can be sufficiently ensured. In other words, the contact area between the sensing electrode 200 and the wire pad part 310 can be increased. Therefore, the sensing electrode 200 can be prevented from being disconnected from the wire 300, so that the electrical characteristic of the touch window can be improved. In addition, even if the sensing electrode 200 may be cracked or disconnected, the sensing electrode 200 can be electrically connected with the wire 300 through the second sensing part 220, so that the reliability of the touch window can be improved.

In particular, when the sensing electrode 200 is provided in the mesh shape, the high disconnection possibility exists at a bottleneck point between the sensing electrode 200 and the wire 300, and the sensing electrode 200 is weak against electric static discharge (ESD). In the embodiment, the above problems may be overcome through the second sensing part 220. Accordingly, the ESD between the sensing electrode 200 and the wire 300, the physical damage of the sensing electrode 200 and the wire 300, and the bending of the sensing electrode 200 and the wire 300 can be prevented due to the second sensing part 220. In other words, resistance concentrated at a boundary region between the wire pad part 310 having a large area and the mesh pattern having a small area can be compensated.

The wire 300 for the electrical connection of the sensing electrode 200 may be formed in the unactive area UA. The wire 300 may include a material the same as or similar to a material constituting the sensing electrode 200. For example, the wire 300 may include metal representing superior electrical conductivity. The wire 300 may include Cr, Ni, Cu, Al, Ag, Mo, or the alloy thereof. In particular, the wire 300 may include various metallic pastes allowing the wire 300 to be formed through a printing process.

The wire pad part 310 may be provided between the wire 300 and the sensing electrode 200. The wire pad part 310 may apply electricity to a plurality of conductive patterns grouped into one unit of the sensing electrode 200.

An electrode pad 400 is positioned at an end of the wire 300. The electrode pad 400 may be connected with the printed circuit board. In detail, although not shown in drawings, the connection terminal may be positioned at one surface of the printed circuit board, and the electrode pad 400 may be connected with the connection terminal. The electrode pad 400 may have the size corresponding to the connection terminal.

Various types of printed circuit boards may be applicable. For example, a flexible printed circuit board (FPCB) is applicable as the printed circuit board.

Figure 4:
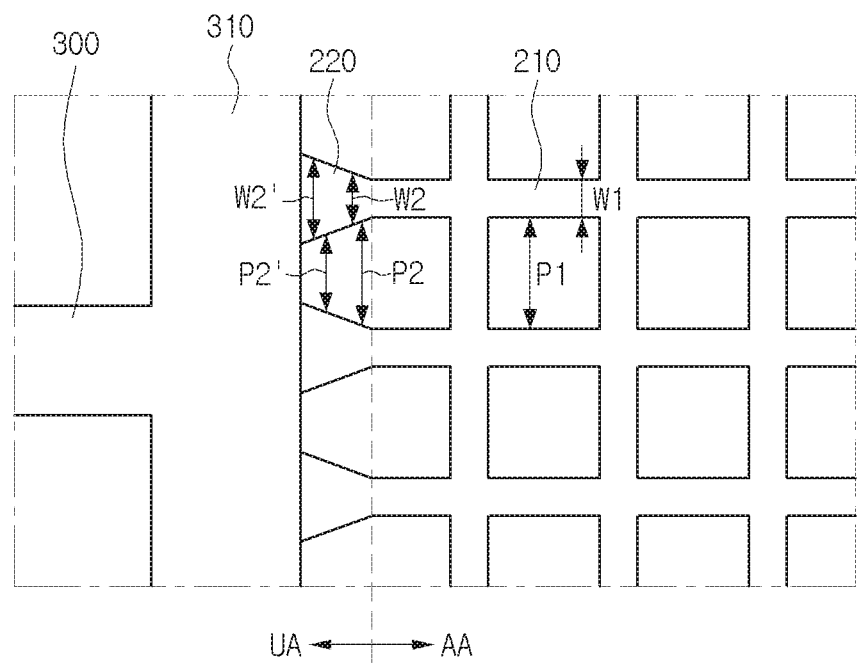
FIG. 4 is an enlarged view showing a touch window according to another embodiment.
Figure 5:
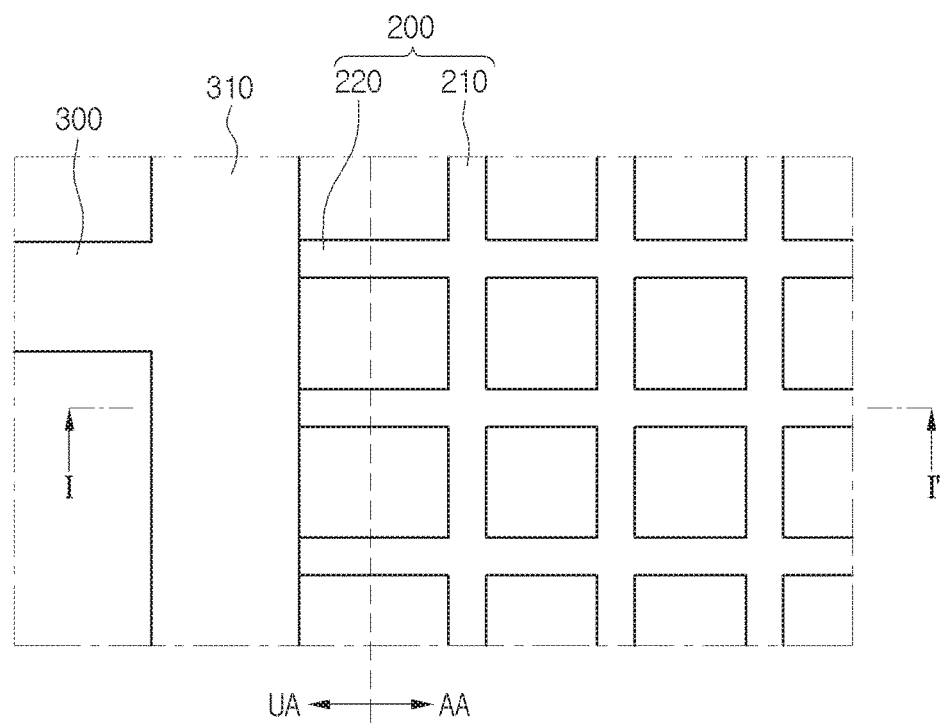
FIG. 5 is an enlarged view showing a touch window according to another embodiment.
Figure 6:
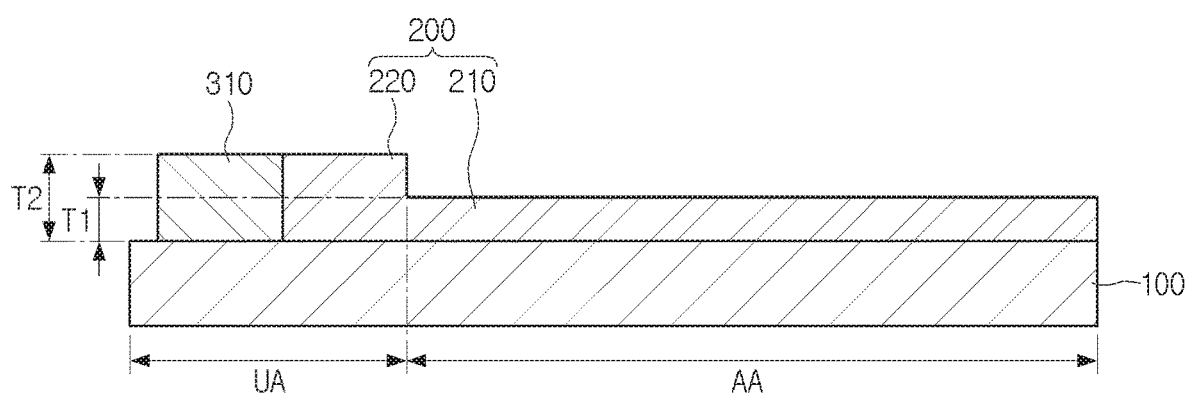
FIG. 6 is a sectional view taken along line I-I' of FIG. 5.
Figure 7:
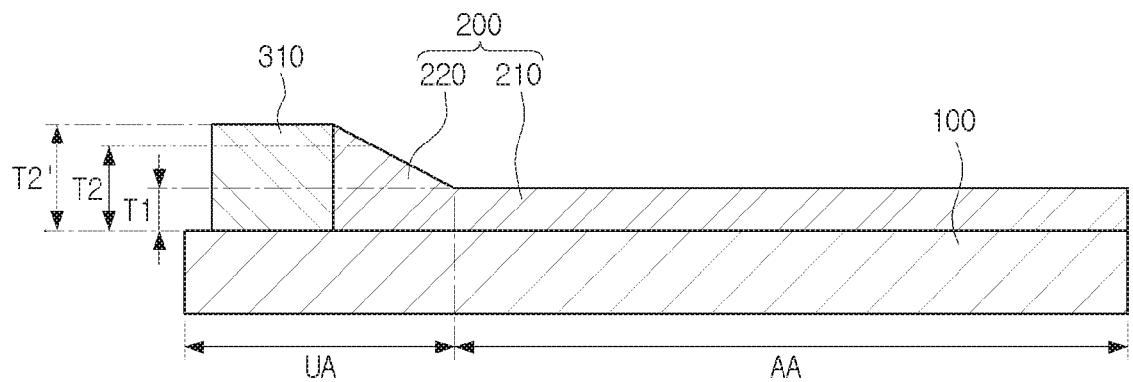
FIG. 7 is a sectional view showing a touch window according to another embodiment.
Figure 8:
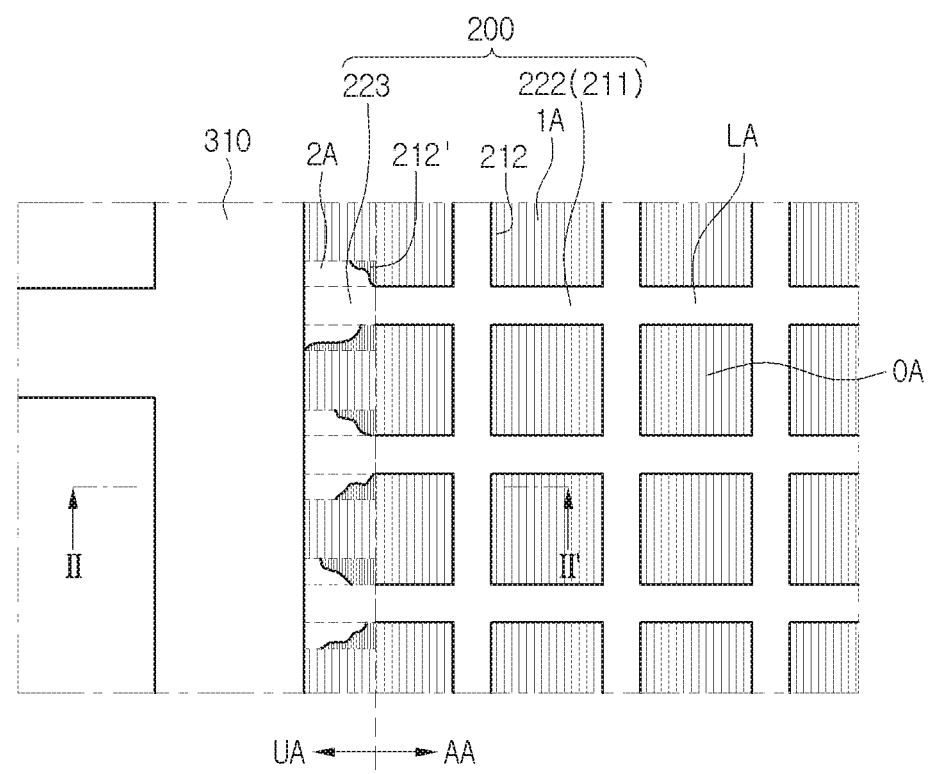
FIG. 8 is an enlarged view showing a touch window according to another embodiment.
Figure 9:
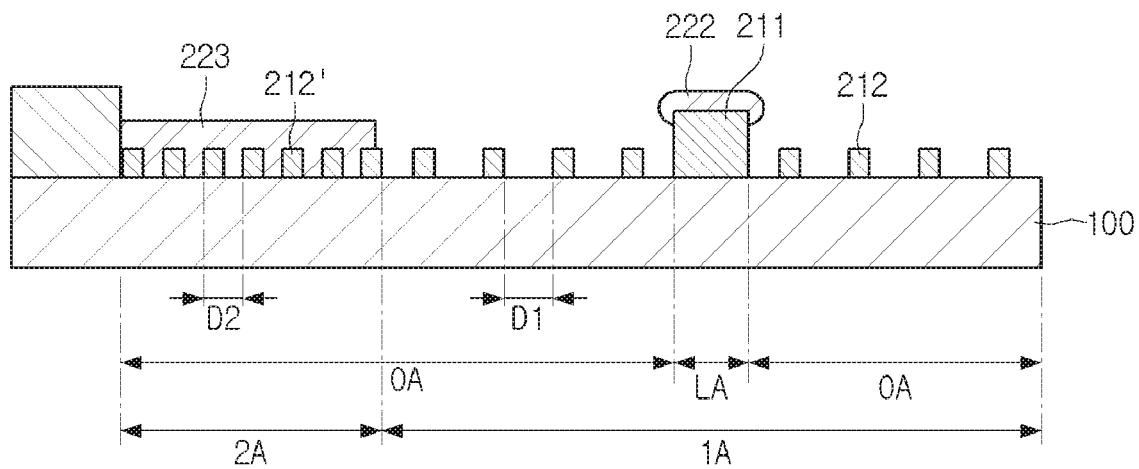
FIG. 9 is a sectional view taken along line II-II' of FIG. 8.
Figure 10:
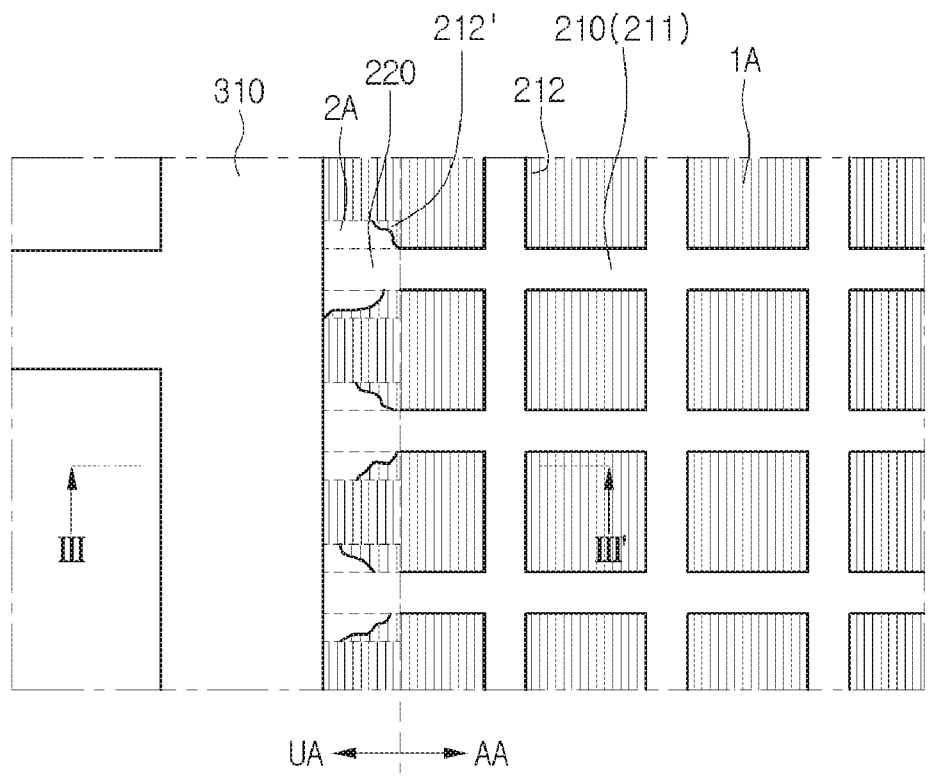
FIG. 10 is an enlarged view showing a touch window according to another embodiment.
Figure 11:
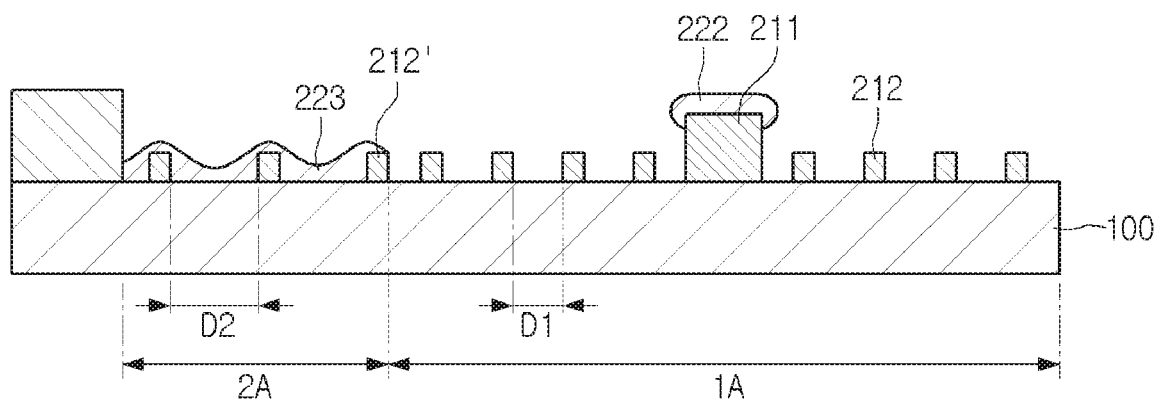
FIG. 11 is a sectional view taken along line III-III' of FIG. 10.
Figure 12:
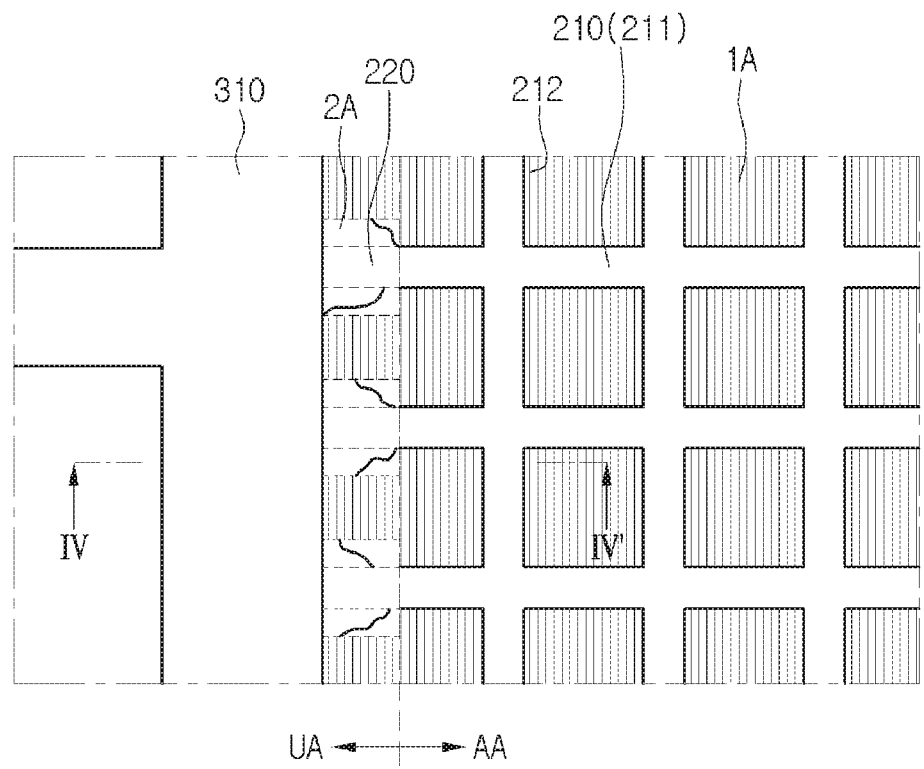
FIG. 12 is an enlarged view showing a touch window according to another embodiment.
Figure 13:
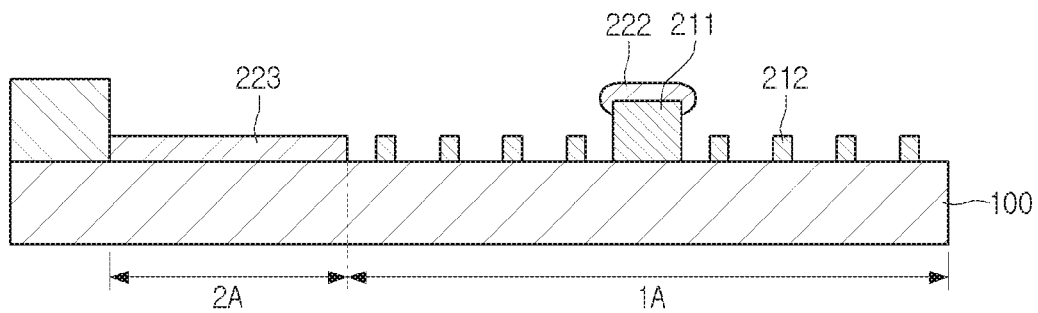
FIG. 13 is a sectional view taken along line IV-IV' of FIG. 12.
Figure 14:
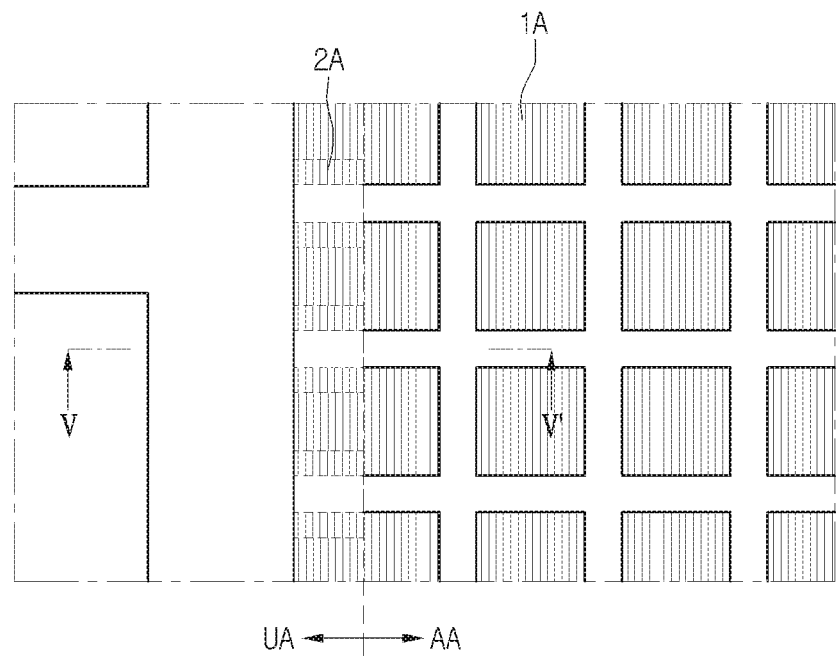
FIG. 14 is an enlarged view showing a touch window according to another embodiment.
Figure 15:
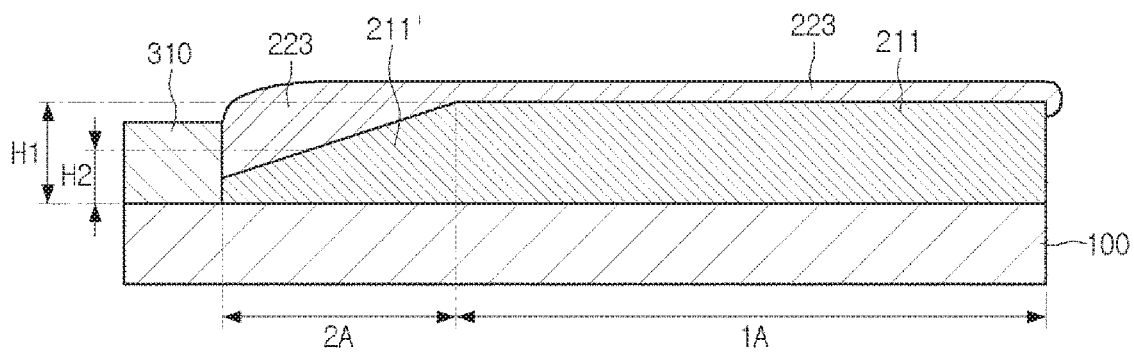
FIG. 15 is a sectional view taken along line V-V' of FIG. 14.
Figure 16:
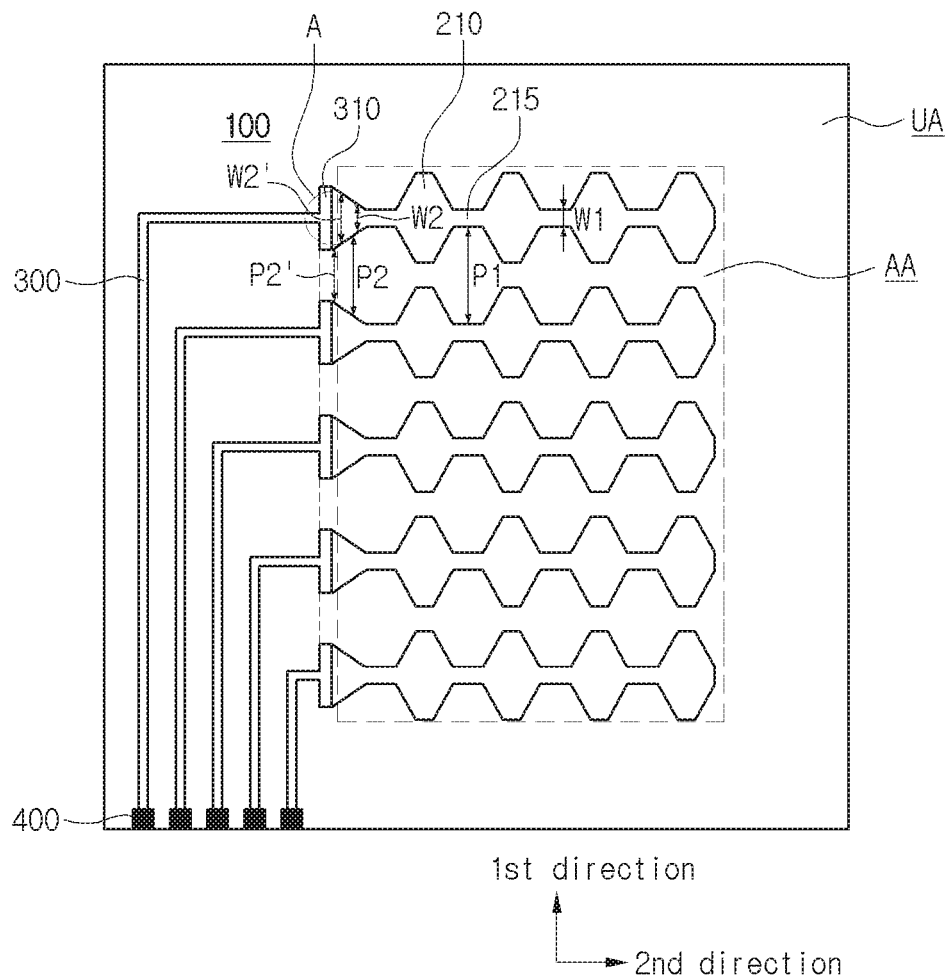
FIG. 16 is an enlarged view showing a touch window according to another embodiment.

Hereinafter, a touch window according to another embodiment will be described with reference to FIGS. 4 to 16. For the clear and brief explanation, the structure and the components the same as or similar to those of the first embodiment will not be further described. FIG. 4 is an enlarged view showing a touch window according to another embodiment. FIG. 5 is an enlarged view showing the touch window according to another embodiment. FIG. 6 is a sectional view taken along line I-I' of FIG. 5. FIG. 7 is a sectional view showing a touch window according to another embodiment. FIG. 8 is an enlarged view showing the touch window according to another embodiment. FIG. 9 is a sectional view taken along line II-II' of FIG. 8. FIG. 10 is an enlarged view showing the touch window according to another embodiment. FIG. 11 is a sectional view taken along line III-III' of FIG. 10. FIG. 12 is an enlarged view showing a touch window according to another embodiment. FIG. 13 is a sectional view taken along line IV-IV' of FIG. 12. FIG. 14 is an enlarged view showing a touch window according to another embodiment. FIG. 15 is a sectional view taken along line V-V' of FIG. 14. FIG. 16 is an enlarged view showing a touch window according to another embodiment.

Referring to FIG. 4, line widths W2 and W2' of the conductive pattern of the second sensing part 220 are thicker than the line width W1 of the conductive pattern of the first sensing part 210. The conductive patterns W2 and W2' of the conductive pattern of the second sensing part 220 may be different from each other. In detail, the line widths W2 and W2' of the conductive pattern of the second sensing part 220 may be gradually widened toward the wire 300. In other words, the line widths W2 and W2' of the conductive pattern of the second sensing part 220 may have greatest values at the contact position between the second sensing part 220 and the wire pad part 310.

In addition, the pitch P1 between conductive patterns of the first sensing part 210 may be different from pitches P2 and P2' between conductive patterns of the second sensing part 220. In detail, the pitches P2 and P2' between the conductive patterns of the second sensing part 220 may be gradually narrowed toward the wire pad part 310.

Thereafter, referring to FIGS. 5 and 6, a thickness T2 of the conductive pattern of the second sensing part 220 may be different from a thickness T1 of the conductive pattern of the first sensing part 210. The thickness T2 of the conductive pattern of the second sensing part 220 may be thicker than the thickness T1 of the conductive pattern of the first sensing part 210.

Meanwhile, referring to FIG. 7, the thicknesses T2 and T2' of the conductive patterns of the second sensing part 220 may be increased toward the wire. In other words, the thicknesses T2 and T2' of the conductive pattern of the second sensing part 220 may have greatest values at the contact position between the second sensing part 220 and the wire pad part 310.

Referring to FIGS. 8 and 9, the sensing electrode 200 may include a first sub-pattern 211, a second sub-pattern 212, and electrode layers 222 and 223.

The first sub-pattern 211 is provided on the substrate 100. The first sub-pattern 211 is provided in the conductive pattern line part LA. Accordingly, the first sub-pattern 211 is provided in a mesh shape. The first sub-pattern 211 may be an embossed pattern, but the embodiment is not limited thereto. In other words, the first sub-pattern 211 may be an intaglio pattern.

The second sub-pattern 212 is provided on the substrate 100. The second sub-pattern 212 is provided in the conductive pattern opening part OA. Accordingly, the second sub-pattern 212 may be provided between the first sub-patterns 211. The second sub-pattern 212 may be an embossed pattern, but the embodiment is not limited. In other words, the second sub-pattern 212 may be an intaglio pattern.

The first and second sub-patterns 211 and 212 may include resin or polymer.

The electrode layer 222 is provided on the first sub-pattern 211. When the first sub-pattern 211 is an intaglio pattern, the electrode layer 222 may be provided in the intaglio pattern. Accordingly, the electrode layer 222 is provided in the mesh shape in the conductive pattern line part LA. The electrode layer 222 may include various metals representing superior electrical conductivity. For example, the electrode layer 222 may include Cu, Au, Ag, Al, Ti, Ni, or the alloy thereof.

The electrode layer 222 may be formed through an etching process after applying an electrode material onto the first sub-pattern 211 and the second sub-pattern 212. In this case, a difference between etched areas may be made depending on the structures of the first and second sub-patterns 211 and 212 and the difference between the contact area of the electrode material and the first sub-pattern 211 and the contact area of the electrode material and the second sub-pattern 212. In other words, since the contact area between the first sub-pattern 211 and the electrode material is larger than the contact area between the second sub-pattern 212 and the electrode material, the electrode material applied onto the first sub-pattern 211 is less etched. In other words, due to the same etch rate, the electrode material applied onto the first sub-pattern 211 remains and the electrode material on the second sub-pattern 212 is removed through the etching process. Accordingly, the electrode layer 222 may be formed only on the first sub-pattern 211, and the electrode layer 222 may be provided in the mesh shape.

Meanwhile, the embodiment is not limited thereto. The conductive pattern may be formed in the intaglio pattern. In detail, a resin layer, which is provided on the substrate, may include an intaglio part. In this case, the electrode layer may be provided in intaglio parts. In other words, the sensing electrode 200 may be formed by filling the electrode material in the intaglio parts. Therefore, the process number, the process time, and the process cost can be increased through conventional deposition and photolithography processes.

In addition, the sensing electrode 200 having the conductive pattern may be formed by etching metallic material on the substrate. For example, the sensing electrode 200 may be formed by etching metal after depositing copper (Cu) on the substrate.

In addition, the sensing electrode 200 may include an interconnecting structure. The interconnecting structure may be a fine structure having a diameter in the range of 10 nm to 200 nm. Preferably, the interconnecting structure may have a fine structure having a diameter in the range of 20 nm to 100 nm. For example, the sensing electrode 200 may include a nanowire. The electrode part 200 may include a metal nanowire.

In this case, the sensing electrode 200 may include a base and a nanowire. The base includes a photosensitive material. The base includes the photosensitive material, so that the sensing electrode 200 may be formed through an exposure and development process.

The sensing electrode 200 may include a photosensitive nanowire film. The sensing electrode 200 includes the photosensitive nanowire film, so that the thickness of the sensing electrode 200 may be reduced. In other words, although the sensing electrode 200 includes the nanowire, the whole thickness of the sensing electrode 200 may be reduced. According to the related art, when the sensing electrode includes a nanowire, an overcoating layer to prevent the nanowire from being oxidized is additionally formed, so that the process is complicated and the thickness of the touch window is increased. However, according to the present embodiment, the nanowire is provided in the photosensitive material so that the nanowire can be prevented from being oxidized without the overcoating layer.

Meanwhile, the sensing electrode 200 may have first and second areas 1A and 2A defined therein. The first area 1A corresponds to the active area AA.

The second area 2A is provided more closely to the wire pad part 310 rather than the first area 1A. The second area 2A may be provided in the unactive area UA.

The number of the second sub-patterns 212' provided in the second area 2A may be different from the number of the second sub-patterns 212 provided in the first area 1A. In detail, the number of the second sub-patterns 212' provided in the second area 2A may be greater than the number of the second sub-patterns 212 provided in the first area 1A.

A distance D2 between the second sub-patterns 212' provided in the second area 2A may be narrower than a distance D1 between the second sub-patterns 212 provided in the first area 1A.

Therefore, when an electrode material is deposited and then etched, the electrode material provided on the second sub-pattern 212' in the second area 2A may be less etched as compared with the electrode material provided on the second sub-pattern 212 in the first area 1A. Accordingly, the electrode layer 223 may be formed by using the electrode material which is not etched and remains on the second sub-pattern 212' in the second area 2A. Therefore, the area of the electrode layer 223 may be increased in the second area 2A.

Meanwhile, referring to FIGS. 10 and 11, on the contrary to FIGS. 8 and 9, the number of the second sub-patterns 212' provided in the second area 2A may be smaller than the number of the second sub-patterns 212 provided in the first area 1A.

The distance D2 between the second sub-patterns 212' provided in the second area 2A may be wider than the distance D1 between the second sub-patterns 212 provided in the first area 1A.

Therefore, when an electrode material is deposited and then etched, the electrode material provided on the second sub-pattern 212' in the second area 2A may be less etched as compared with the electrode material provided on the second sub-pattern 212 in the first area 1A. Accordingly, the electrode layer 223, which is not etched and remains, may be formed on the second sub-pattern 212' in the second area 2A and the substrate 100. Therefore, the area of the electrode layer 223 may be widened in the second area 2A.

Referring to FIGS. 12 and 13, the second sub-pattern may not be provided in the second area 2A. Accordingly, after the electrode layer 223 is deposited on the substrate 100 in the second area 2a, the electrode layer 223 may be less etched.

Referring to FIGS. 14 and 15, a height H2 of the first sub-pattern 211' provided in the second area 2A may be lower than a height H1 of the first sub-pattern 211 provided in the first area 1A. In detail, the height H2 of the first sub-pattern 211' provided in the second area 2A may be lowered toward the wire pad part 310. Therefore, the electrode layer 223 provided on the first sub-patterns 211 and 211' may be gradually thickened toward the wire pad part 310.

Referring to FIG. 16, the first sensing part 210 may have a diamond shape. In other words, the first sensing part 210 may have the diamond shape instead of the mesh shape.

A connection part 215 may be interposed between first sensing parts 210. The connection part 215 may connect the first sensing parts 210 with each other. The connection part 215 may be formed integrally with the first sensing part 210.

The line widths W2 and W2' of the second sensing part 220 making contact with the wire pad part 310 may be gradually widened toward the wire 300. In addition, the line widths W2 and W2' of the second sensing part 220 may be wider than the connection part 215. In this case, the line widths W2 and W2' of the second sensing part 220 may have values varied depending on positions. In detail, the line widths W2 and W2' of the second sensing part 220 may be gradually widened toward the wire 300. In other words, the line widths W2 and W2' of the second sensing part 220 may have greatest values at the contact position between the second sensing part 220 and the wire pad part 310.

In addition, a pitch P1 between the connection parts 215 may be different from pitches P2 and P2' between the second sensing parts 220. In detail, the pitches P2 and P2' between the second sensing parts 220 may be gradually widened toward the wire pad part 310.

Figure 17:
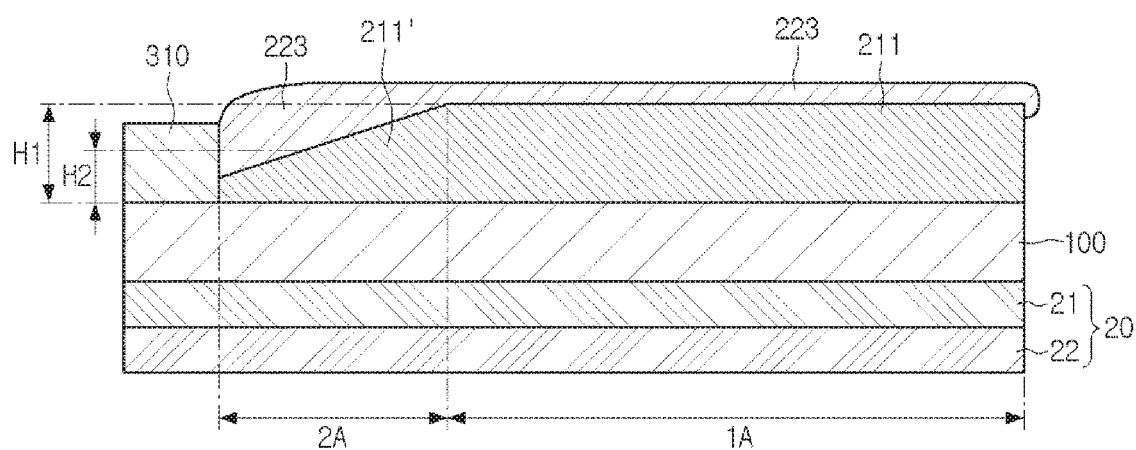
FIG. 17 is a sectional view showing a touch device in which the touch window according to the embodiment is displayed on a display panel.

Meanwhile, although the first sensing part 210 extends in a second direction as shown in FIG. 16, the embodiment is not limited thereto. Accordingly, a sensing part having a diamond shape extending in the first direction crossing the second direction may be additionally provided on the substrate 100. Meanwhile, referring to FIG. 17, the touch window 10 may be provided on a display panel 20 serving as a driving part. The touch window 10 is combined with the display panel 20 to constitute a touch device.

The display panel 20 has a display region on which images are output. The display panel applied to the touch device may generally include upper and lower substrates 21 and 22. The lower substrate 22 may be provided on with a data line, a gate line, and a thin film transistor (TFT). The upper substrate 21 may be bonded to the lower substrate 22 to protect components provided on the lower substrate 22.

Figure 18:
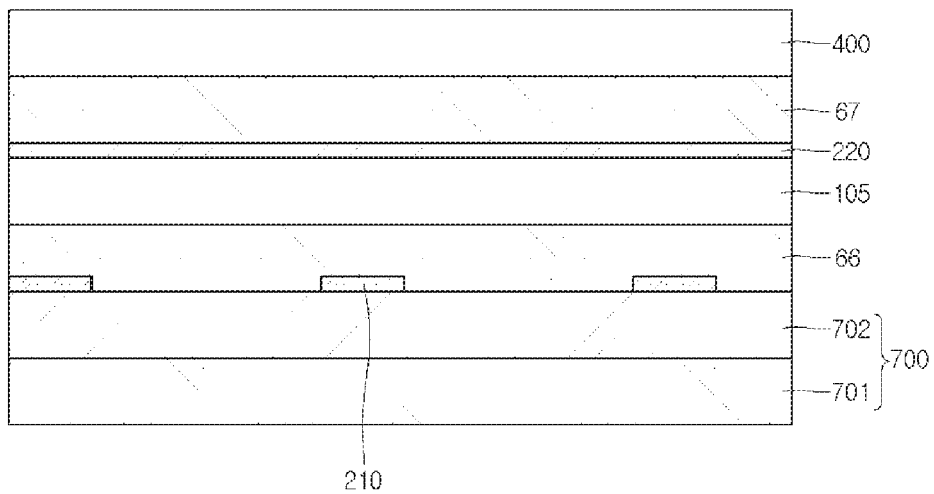
FIGS. 18 to 23 are sectional views showing a touch device in which the touch window according to the embodiment is disposed on a display panel according to various embodiments.
Figure 23:
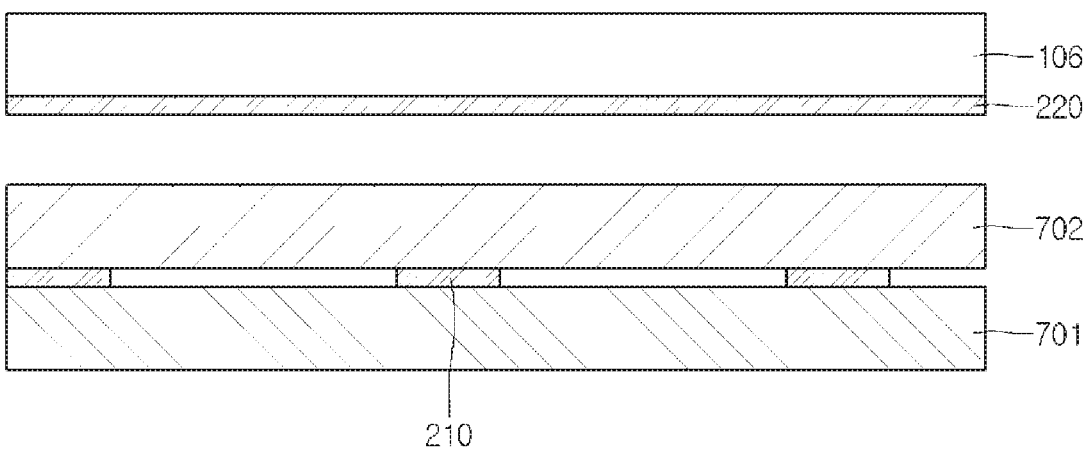

The display panel 20 may include various display panels depending on a type of the touch device according to the embodiment. Referring to FIGS. 18 and 23, a touch device according to the embodiment may include a touch window formed integrally with a display panel 700. In other words, a substrate to support at least one sensing electrode may be omitted.

In detail, at least one sensing electrode may be formed on at least one surface of the display panel 700. The display panel 700 includes first and second substrates 701 and 702. In other words, at least one sensing electrode may be formed on at least one surface of the first substrate 701 or the second substrate 702.

If the display panel 700 is a liquid crystal display panel, the display panel 700 may be formed in a structure that the first substrate 701 including a thin film transistor (TFT) and a pixel electrode and the second substrate 702 including color filters are combined with each other while interposing a liquid crystal layer therebetween.

In addition, the display panel 700 may include a liquid crystal display panel having a color filter on transistor (COT) structure in which a TFT, a color filter, and a black matrix are formed on the first substrate 701, and the second substrate 702 is combined with the first substrate 701 while interposing a liquid crystal layer between the second substrate 702 and the first substrate 701. In other words, the TFT may be formed on the first substrate 701, a protective layer may be formed on the TFT, and the color filter lay may be formed on the protective layer. In addition, a pixel electrode making contact with the TFT is formed on the first substrate 701. In this case, the black matrix may be omitted to improve an opening ratio and to simplify a mask process, and a common electrode may perform both of the inherent function thereof and the function as the black matrix.

In addition, if the display panel 700 is the liquid crystal display panel, a display device may further include a backlight unit to provide light to a bottom surface of the display panel 700.

If the display panel 700 is an organic electroluminescence display panel, the display panel 700 includes a self-emissive device that does not require an additional light source. The display panel 700 includes the first substrate 701 formed thereon with a TFT and an organic light emitting device making contact with the TFT. The organic light emitting device may include an anode, a cathode, and an organic light emitting layer interposed between the anode and the cathode. In addition, the second substrate 702, which serves as an encapsulation substrate for encapsulation, may be further provided on the organic light emitting device.

In this case, at least one sensing electrode may be formed on a top surface of an upper substrate. Although the sensing electrode is formed on the top surface of the second substrate 702 in the drawings, when the first substrate 701 serves as the upper substrate, at least one sensing electrode may be formed on the top surface of the first substrate 701.

Referring to FIG. 18, the first sensing electrode 210 may be formed on the top surface of the display panel 700. In addition, a first wire connected with the first sensing electrode 210 may be formed. A touch substrate 105 having the second sensing electrode 220 and the second wire may be formed on the display panel 700 having the first sensing electrode 210. A first bonding layer 66 may be interposed between the touch substrate 105 and the display panel 700.

Although the drawing shows that the second sensing electrode 220 is formed on the top surface of the touch substrate 105, and a cover substrate 130 is formed on the touch substrate 105 while interposing a second bonding layer 67 between the touch substrate 105 and the cover substrate 130, the embodiment is not limited thereto. The second sensing electrode 220 may be formed on a bottom surface of the touch substrate 105. In this case, the touch substrate 105 may serve as the cover substrate.

In other words, the embodiment is not limited to the structure shown in the drawing, but various modifications are possible if the first electrode 210 is formed on a top surface of the display panel 700, the touch substrate 105 to support the second sensing electrode 220 is disposed on the display panel 700, and the touch substrate 105 is combined with the display panel 700.

In addition, the touch substrate 105 may include a polarizer. In other words, the second sensing electrode 220 may be formed on top and bottom surfaces of the polarizer. Accordingly, the second sensing electrode 220 may be formed integrally with the polarizer.

In addition, the polarizer may be provided independently from the touch substrate 105. In this case, the polarizer may be disposed under the touch substrate 105. For example, the polarizer may be interposed between the touch substrate 105 and the display panel 700. In addition, the polarizer may be disposed above the touch substrate 105.

The polarizer may include a linear polarizer or an anti-reflective polarizer for external light. For example, if the display panel 700 is a liquid crystal display panel, the polarizer may include the linear polarizer. In addition, if the display panel 700 is an organic electroluminescence display panel, the polarizer may be the anti-reflective polarizer for the external light.

Figure 19:
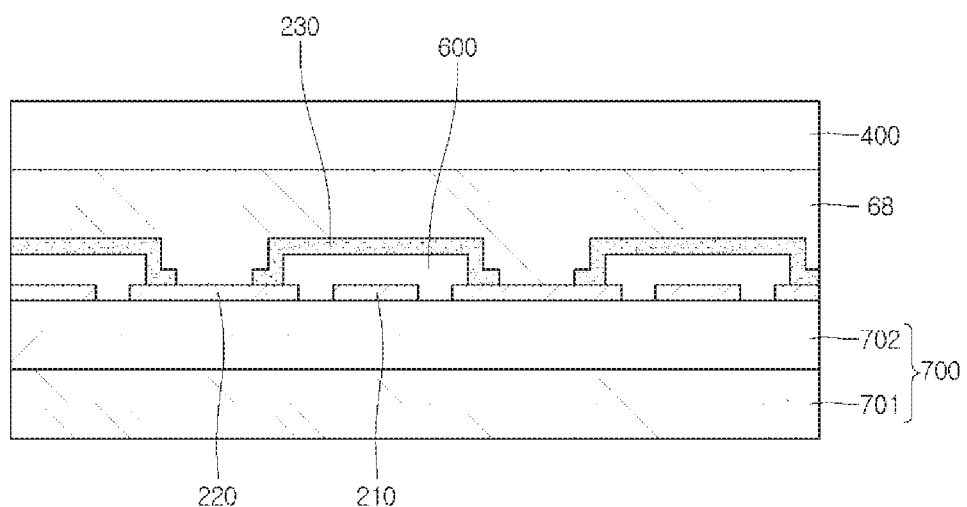

Referring to FIG. 19, the first and second sensing electrodes 210 and 220 may be formed on the top surface of the display panel 700. In addition, the display panel 700 may be formed on the top surface thereof with the first wire connected with the first sensing electrode 210 and the second wire connected with the second sensing electrode 220.

In addition, an insulating layer 600 may be formed on the first sensing electrode 210 and expose the second sensing electrode 220. A bridge electrode 230 may be further formed on the insulating layer 600 for the connection between second sensing electrodes 220.

However, the embodiment is not limited to the structure shown in the drawings, and the display panel 700 may be formed on the top surface thereof with the first sensing electrode 210, the first wire, and the second wire, and the insulating layer may be formed on the first sensing electrode 210 and the first wire. The insulating layer may be formed thereon with the second sensing electrode 220, and a connection part may be further provided to connect the second sensing electrode 220 with the second wire.

The first and second sensing electrodes 210 and 220 and the first and second wires may be formed in an active area on the top surface of the display panel 700. The first and second sensing electrodes 210 and 220 may be spaced apart from each other while being adjacent to each other. In other words, the insulating layer and the bridge electrode may be omitted.

In other words, the embodiment is not limited to the structure shown in the drawing, but various modifications are possible if the first and second sensing electrodes 210 and 220 are formed on the display panel 700 without an additional sensing electrode support substrate.

The cover substrate 130 may be disposed above the display panel 700 while a bonding layer 68 is interposed between the display panel 700 and the cover substrate 130. In this case, the polarizer may be interposed between the display panel 700 and the cover substrate 130.

In the touch device according to the embodiment, at least one substrate to support the sensing electrode may be omitted. Accordingly, a thin and light touch device can be formed.

Hereinafter, a touch device according to another embodiment will be described with reference to FIGS. 20 to 23. The details of the same structure and elements as those described above will be omitted. The same reference numerals will be assigned to the same elements.

Referring to FIGS. 20 to 23, the touch device according to the present embodiment may include a touch window formed integrally with a display panel. In other words, at least one or all of substrates to support sensing electrodes may be omitted.

A sensing electrode disposed at an active area to serve as a sensor, which senses a touch, and a wire to apply an electrical signal to the sensing electrode may be formed inside the display panel. In more detail, at least one sensing electrode or at least one wire may be formed inside the display panel.

The display panel includes the first and second substrates 701 and 702. In this case, at least one of the first and second sensing electrodes 210 and 220 is interposed between the first and second substrates 701 and 702. In other words, at least one sensing electrode may be formed on at least one surface of the first substrate 701 or the second substrate 702.

Figure 20:
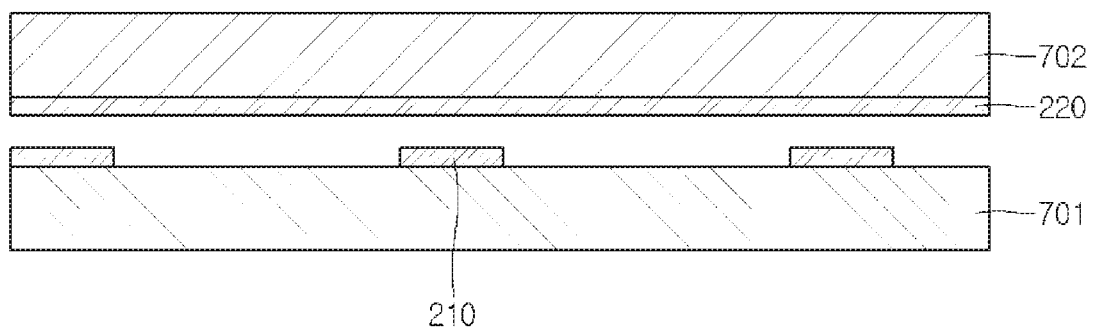
Figure 21:
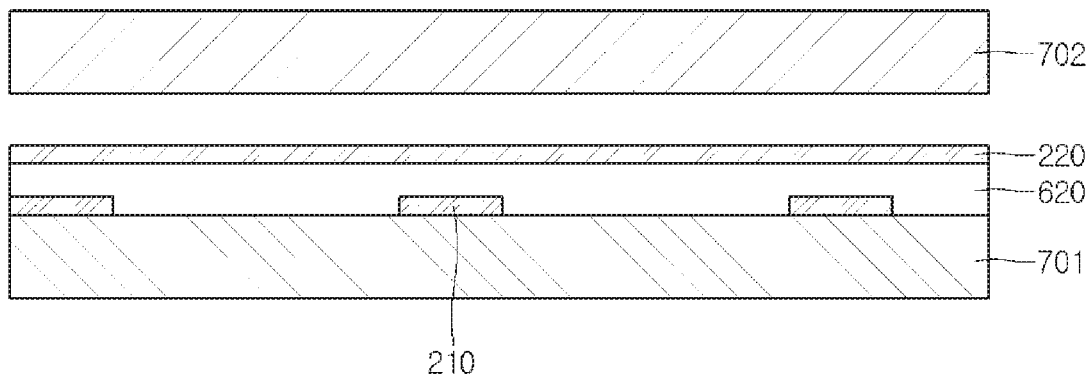
Figure 22:
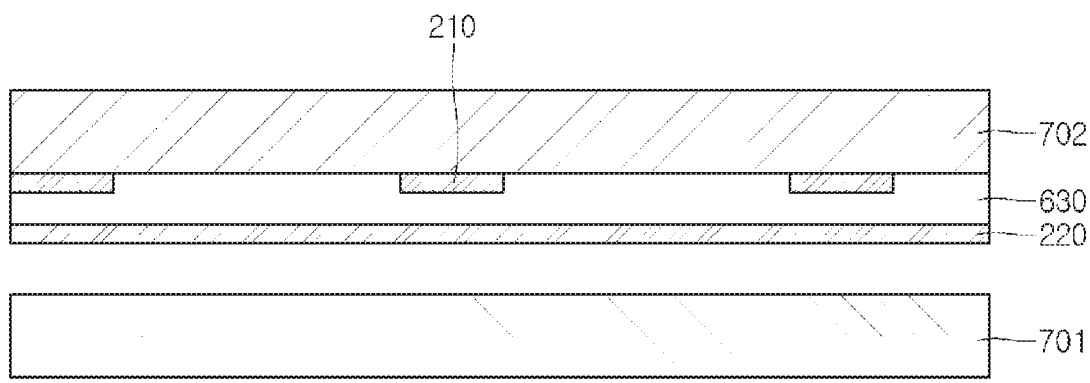

Referring to FIGS. 20 to 22, the first and second sensing electrodes 210 and 220 and first and second wires may be interposed between the first and second substrates 701 and 702. In other words, the first and second sensing electrodes 210 and 220 and the first and second wires may be disposed inside the display panel.

Referring to FIG. 20, the first sensing electrode 210 and the first wire may be formed on the top surface of the first substrate 701 of the display panel, and the second sensing electrode 220 and the second wire may be formed on the bottom surface of the second substrate 702. Referring to FIG. 21, the first and second sensing electrodes 210 and 220 and the first and second wires may be formed on the top surface of the first substrate 701. An insulating layer 620 may be interposed between the first and second sensing electrodes 210 and 220. In addition, referring to FIG. 22, the first and second sensing electrodes 210 and 220 may be formed on the bottom surface of the second substrate 702. An insulating layer 630 may be interposed between the first and second sensing electrodes 210 and 220.

Referring to FIG. 23 the first sensing electrode 210 and the first wire may be interposed between the first and second substrates 701 and 702. In addition, the second sensing electrode 220 and the second wire may be formed on a touch substrate 106. The touch substrate 106 may be disposed on the display panel including the first and second substrates 701 and 702. In other words, the first sensing electrode 210 and the first wire may be disposed inside the display panel, and the second sensing electrode 220 and the second wire may be disposed outside the display panel.

The first sensing electrode 210 and the first wire may be formed on a top surface of the first substrate 701 or a bottom surface of the second substrate 702. In addition, a bonding layer may be interposed between the touch substrate 106 and the display panel. In this case, the touch substrate 105 may serve as the cover substrate.

Although the drawing shows that the second sensing electrode 220 is formed on a bottom surface of the touch substrate 106, the embodiment is not limited thereto. The touch substrate 106 may be formed on a top surface thereof with the second sensing electrode 220, and may be additionally formed on the top surface thereof with a cover substrate that interposes a bonding layer between the cover substrate and the touch substrate 106.

In other words, the embodiment is not limited to the structure shown in the drawing, but various modifications are possible if the first sensing electrode 210 and the first wire are disposed inside the display panel, and the second sensing electrode 220 and the second wire are disposed outside the display panel.

In addition, the touch substrate 106 may be the polarizer. In other words, the second sensing electrode 220 may be formed on top and bottom surfaces of the polarizer. Accordingly, the sensing electrode may be formed integrally with the polarizer.

In addition, the polarizer may be provided independently from the touch substrate 106. In this case, the polarizer may be disposed under the touch substrate 106. For example, the polarizer may be interposed between the touch substrate 105 and the display panel 700. In addition, the polarizer may be disposed above the touch substrate 106.

If the display panel is a liquid crystal display panel, and the sensing electrode is formed on a top surface of the first substrate 701, the sensing electrode may be formed together with a TFT or a pixel electrode. In addition, if the sensing electrode is formed on a bottom surface of the second substrate 702, a color filter layer may be formed on the sensing electrode or the sensing electrode may be formed on the color filter layer. If the display panel is an organic electroluminescence display panel, and the sensing electrode is formed on the top surface of the first substrate 701, the sensing electrode may be formed together with a TFT or an organic light emitting device.

Further, in the touch device according to the embodiment, an additional substrate to support the sensing electrode may be omitted. Accordingly, a thin and light touch device can be formed. In addition, the sensing electrode and the wire are formed together with devices formed on the display panel, so that the process can be simplified and the costs can be saved.

The touch window may be applied to a vehicle as well as a mobile terminal, so that the touch window may be applied to a PND (Personal Navigation Display) such as a vehicle navigator. In addition, the touch window may be applied to a dashboard, so that a CID (Center Information Display) may be implemented. However, the embodiment is not limited to the above, and the display device may be used for various electronic appliances.

The embodiment provides a touch window having improved reliability.

According to the embodiment, there is provided a touch window including a sensing electrode to sense a position, and a wire to electrically connect the sensing electrode. A width of the sensing electrode is variable in the sensing electrode.

As described above, according to the touch window of the embodiment, the contact area between the sensing electrode and the wire can be sufficiently ensured. Therefore, the sensing electrode can be prevented from being disconnected from the wire, so that the electrical characteristic of the touch window can be improved. In addition, even if the sensing electrode may be cracked or disconnected, the sensing electrode can be electrically connected with the wire through the second sensing part, so that the reliability of the touch window can be improved.

In particular, when the sensing electrode is provided in the mesh shape, the high disconnection possibility exists at a bottleneck point between the sensing electrode and the wire, and the sensing electrode is weak against electric static discharge (ESD). In the embodiment, the above problems may be overcome through the second sensing part. Accordingly, the ESD between the sensing electrode and the wire, the physical damage of the sensing electrode and the wire, and the bending of the sensing electrode and the wire can be prevented due to the second sensing part. In other words, resistance concentrated at a boundary region between the wire pad part having a large area and the mesh pattern having a small area can be compensated.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch window comprising:
    a sensing electrode having a mesh shape that includes:
        a plurality of first conductive lines extending in a first direction,
        a plurality of second conductive lines extending in a second direction; and
        a wire including a wire pad,
        wherein the sensing electrode is provided in an active area and an unactive area of a substrate,
        wherein an outer dummy layer defines the unactive area of the substrate,
        wherein the wire pad includes a side in contact with the sensing electrode,
        wherein the first conductive lines and the second conductive lines cross each other to form a plurality of connecting portions, the plurality of connecting portions including at least one first connecting portion closest to the wire pad and an adjacent connecting portion that is further from the wire pad than the first connecting portion, and
        the at least one first connecting portion having an outer line portion of a specific one of the first and second conductive lines extending toward the wire pad and an inner line portion of the specific one of the first and second conductive lines extending toward the adjacent connecting portion, wherein the outer line portion of the at least one first connecting portion includes:
            a first part of the specific one of the first and second conductive lines having a uniform width in the first direction, and
            a second part of the specific one of the first and second conductive lines disposed between the wire pad and the first part,
        wherein a width of the second part varies, in a direction parallel to the side of the wire pad, as the second part extends from the first part to the wire pad,
        wherein the second part is provided in the unactive area of the substrate,
        wherein the second part is adjacent to another second part, and a maximum width of the second part is less than a half of a pitch between the two adjacent second parts, and
    wherein the sensing electrode is formed by etching metallic material on the substrate,
    wherein an opening is formed by the first and second conductive lines,
    wherein a maximum pitch between the two adjacent second parts is greater than a width of the opening,
    wherein the width of the opening is defined as a distance between two adjacent first conductive lines or a distance between two adjacent second conductive lines,
    wherein the first part has a first thickness in a third direction, the third direction being perpendicular to the first direction and perpendicular to the second direction,
    wherein the second part has a thickness that increases, in the third direction, as the second part extends from the first part to the wire pad,
    wherein the second part, having the thickness that increases, is provided in the unactive area of the substrate.

2. The touch window of claim 1, wherein the width of the second part increases, in the direction parallel to the side of the wire pad, as the second part extends from the first part to the wire pad.

3. The touch window of claim 2, wherein the maximum width of the second part is larger than the width of the first part.

4. The touch window of claim 3, wherein the maximum width of the second part is longer than a width of one of the connecting portions.

5. The touch window of claim 2, wherein a minimum width of the second part is same as the uniform width of the first part.

6. The touch window of claim 1, wherein the second part is adjacent to the another second part, and distances between the two adjacent second parts, in the direction parallel to the side of the wire pad, are decreased as the second part extends from the first part to the wire pad.

7. The touch window of claim 6, wherein the first part is adjacent to another first part, and the distances between the two adjacent second parts are different from a distance between the two adjacent first parts.

8. The touch window of claim 6, wherein the first part is adjacent to another first part, and a distance between the two adjacent first parts, in the direction parallel to the side of the wire pad, is continually the same.

9. The touch window of claim 1, wherein the width of the second part is different than the uniform width of the first part.

10. The touch window of claim 1, further comprising a cover substrate, wherein the touch window has a plurality of sensing electrodes and a plurality of wires are in contact with the plurality of sensing electrodes.

11. The touch window of claim 1, wherein the outer line portion directly contacts the wire pad, and another outer line portion directly contacts the wire pad.

12. A touch window comprising:
a sensing electrode having a mesh shape that includes:
  a plurality of first conductive lines extending in a first direction;
  a plurality of second conductive lines extending in a second direction; and
  a wire including a wire pad,
wherein the sensing electrode is provided on an active area of a substrate and on an unactive area of the substrate,
wherein an outer dummy layer defines the unactive area of the substrate,
wherein the wire pad includes a side in contact with the sensing electrode,
wherein the first conductive lines and the second conductive lines cross each other to form a plurality of connecting portions, the plurality of connecting portions including at least one first connecting portion immediately adjacent to the wire pad and an adjacent connecting portion that is further from the wire pad than the first connecting portion, and
the at least one first connecting portion having an outer line portion of a specific one of the first and second conductive lines extending toward the wire pad and an inner line portion of the specific one of the first and second conductive lines extending toward the adjacent connecting portion,
wherein the outer line portion of the first connecting portion includes:
  a first part of the specific one of the first and second conductive lines having a uniform width in the first direction, and
  a second part of the specific one of the first and second conductive lines disposed between the wire pad and the first part,
wherein a width of the second part varies, in a direction parallel to the side of the wire pad, as the second part extends from the first part to the wire pad,
wherein the second part is provided on the unactive area of the substrate,
wherein the second part is adjacent to another second part, and a maximum width of the second part is less than a half of a pitch between the two adjacent second parts, and
wherein the sensing electrode is formed by etching metallic material on the substrate,
wherein an opening is formed by the first and second conductive lines,
wherein a maximum pitch between the two adjacent second parts is greater than a width of the opening,
wherein the width of the opening is defined as a distance between two adjacent first conductive lines or a distance between two adjacent second conductive lines,
wherein the first part has a first thickness in a third direction, the third direction being perpendicular to the first direction and perpendicular to the second direction,
wherein the second part has a thickness that increases, in the third direction, as the second part extends from the first part to the wire pad,
wherein the second part, having the thickness that increases, is provided in the unactive area of the substrate.

13. The touch window of claim 12, wherein the width of the second part increases, in the direction parallel to the side of the wire pad, as the second part extends from the first part to the wire pad.

14. The touch window of claim 13, wherein the width of the second part is different than the uniform width of the first part.

15. The touch window of claim 13, wherein the maximum width of the second part is larger than the uniform width of the first part.

16. The touch window of claim 15, wherein the maximum width of the second part is longer than a width of one of the connecting portions.

17. The touch window of claim 13, wherein a minimum width of the second part is same as the uniform width of the first part.

18. The touch window of claim 12, wherein the first part is adjacent to another first part, and a distance between the two adjacent first parts, in the direction parallel to the side of the wire pad, is continually the same.

19. The touch window of claim 12, wherein the outer line portion directly contacts the wire pad, and another outer line portion directly contacts the wire pad.

20. The touch window of claim 12, wherein the second part is adjacent to the another second part, and distances between the two adjacent second parts, in the direction parallel to the side of the wire pad, are decreased as the second part extends from the first part to the wire pad.

21. The touch window of claim 20, wherein the first part is adjacent to another first part, and the distances between the two adjacent second parts are different from a distance between the two adjacent first parts.

22. A touch window comprising:
a sensing electrode having a mesh shape that includes:
  a plurality of first conductive lines extending in a first direction,
  a plurality of second conductive lines extending in a second direction different from the first direction to form a plurality of intersections between the first and second conductive lines; and
  a wire including a wire pad,
wherein the sensing electrode is provided on an active area of a substrate and on an unactive area of the substrate,
wherein an outer dummy layer defines the unactive area of the substrate,
wherein the wire pad includes a side in contact with a plurality of contact portions of the sensing electrode, each contact portion only comprising:
  a single first part of a specific one of the first and second conductive lines having a uniform width, and
  a single second part of the specific one of the first and second conductive lines connected to the single first part and the side of the wire pad,
wherein a width of the single second part varies, in a direction parallel to the side of the wire pad, as the single second part extends from the single first part to the side of the wire pad, wherein the single first part is connected to a single corresponding intersection of first and second conductive lines, wherein the single second part is provided on the unactive area of the substrate, wherein the single second part is adjacent to another single second part, and a maximum width of the single second part is less than a half of a pitch between the two adjacent single second parts, wherein the sensing electrode is formed by etching metallic material on the substrate, wherein an opening is formed by the first and second conductive lines, wherein a maximum pitch between the two adjacent single second parts is greater than a width of the opening, wherein the width of the opening is defined as a distance between two adjacent first conductive lines or a distance between two adjacent second conductive lines, wherein the single first part has a first thickness in a third direction, the third direction being perpendicular to the first direction and perpendicular to the second direction, wherein the single second part has a thickness that increases, in the third direction, as the second part extends from the first part to the wire pad, wherein the single second part, having the thickness that increases, is provided in the unactive area of the substrate.

23. The touch window of claim 22, wherein the width of the single second part increases, in the direction parallel to the side of the wire pad, as the single second part extends from the single first part to the wire pad.

24. The touch window of claim 22, wherein the maximum width of the single second part is larger than the uniform width of the single first part.

25. The touch window of claim 22, wherein a minimum width of the single second part is same as the uniform width of the single first part.

26. The touch window of claim 22, wherein the single second part is adjacent to the another single second part, and distances between the two adjacent single second parts, in the direction parallel to the side of the wire pad, are decreased as the single second part extends from the single first part to the wire pad.

27. The touch window of claim 26, wherein the single first part is adjacent to another single first part, and the distances between the two adjacent single second parts are different from a distance between the two adjacent single first parts.

28. The touch window of claim 26, wherein the single first part is adjacent to another single first part, and a distance between the two adjacent single first parts, in the direction parallel to the side of the wire pad, is continually the same.

29. The touch window of claim 22, wherein the width of the single second part is different than the uniform width of the single first part.

30. The touch window of claim 22, wherein at least two contact portions directly contact the wire pad.

\* \* \* \* \*